J. SHAW.
Union or Joint for Pipes.

No. 198,818. Patented Jan. 1, 1878.

Witnesses.
Alf. L. Leonard
Henri Guillaume

Inventor
Joseph Shaw
M. Henry Orth

UNITED STATES PATENT OFFICE.

JOSEPH SHAW, OF HUDDERSFIELD, ENGLAND.

IMPROVEMENT IN UNIONS OR JOINTS FOR PIPES.

Specification forming part of Letters Patent No. 198,818, dated January 1, 1878; application filed November 19, 1877.

*To all whom it may concern:*

Be it known that I, JOSEPH SHAW, of Lockwood, near Huddersfield, in the county of York and Kingdom of England, have invented certain new and useful Improvements in Unions or Joints for Pipes; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention consists in making a union or joint for pipes, so that they can be readily applied and adjusted; and the improvements consist in the employment of a nut having a rim or flange at one end. On the face of this flange is a projection, which enters a corresponding recess formed in a flange of another nut. Upon both nuts is placed a loose rim or flange, having a series of holes for the insertion of bolts or pins. The two nuts are screwed or otherwise secured onto the ends of the pipes to be joined, and are then placed together, and fastened by bolts passing through both the loose flanges.

This invention will be better understood by reference to the accompanying sheet of drawings, wherein—

Figure 1:
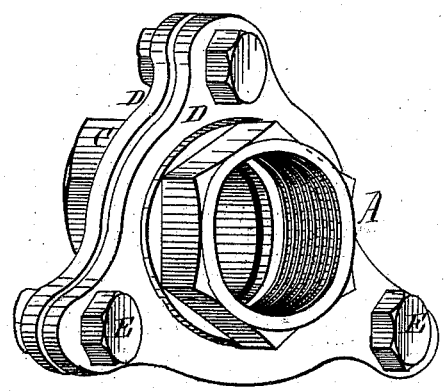
Figure 2:
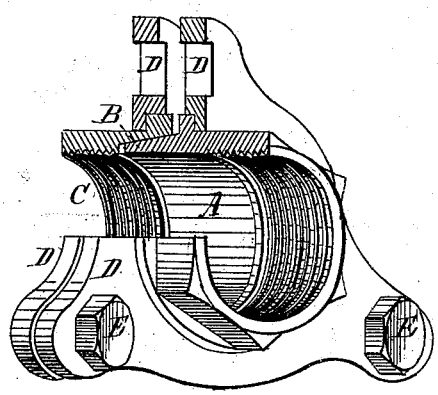

Figure 1 represents an oblique view of my improved union or joint, and Fig. 2, a section of same.

A is a nut, which is screwed or otherwise fastened onto the end of a pipe intended to be joined, and B is a tapered projection, which fits into a corresponding recess formed in another nut, C. D are loose flanges placed upon each nut, so that the two nuts can be drawn together by the bolts E, thereby making a perfectly tight joint without the aid of packing.

Figure 3:
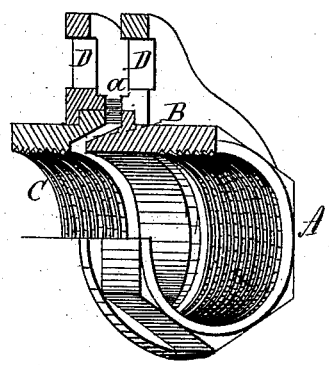

It will be seen by any person at all conversant with mechanics that a good joint may also be made by letting the projection B fit loosely in the recess of the nut C, and an india-rubber ring or other packing, $a$, placed between the faces of the two nuts, as shown in Fig. 3.

I claim as my invention—

The loose flanges D, in combination with nuts A, for the purposes herein shown and described.

In testimony that I claim the foregoing I have hereunto set my hand this 4th day of September, 1877.

JOSEPH SHAW.

Witnesses:
   HENRY WEINTZ,
      *Gledholt Bank, Huddersfield,*
         *Solicitor's Clerk.*
   ALFRED BLAKELEY,
      *Netherton in Huddersfield,*
         *Solicitor's Clerk.*